Patented Jan. 15, 1946

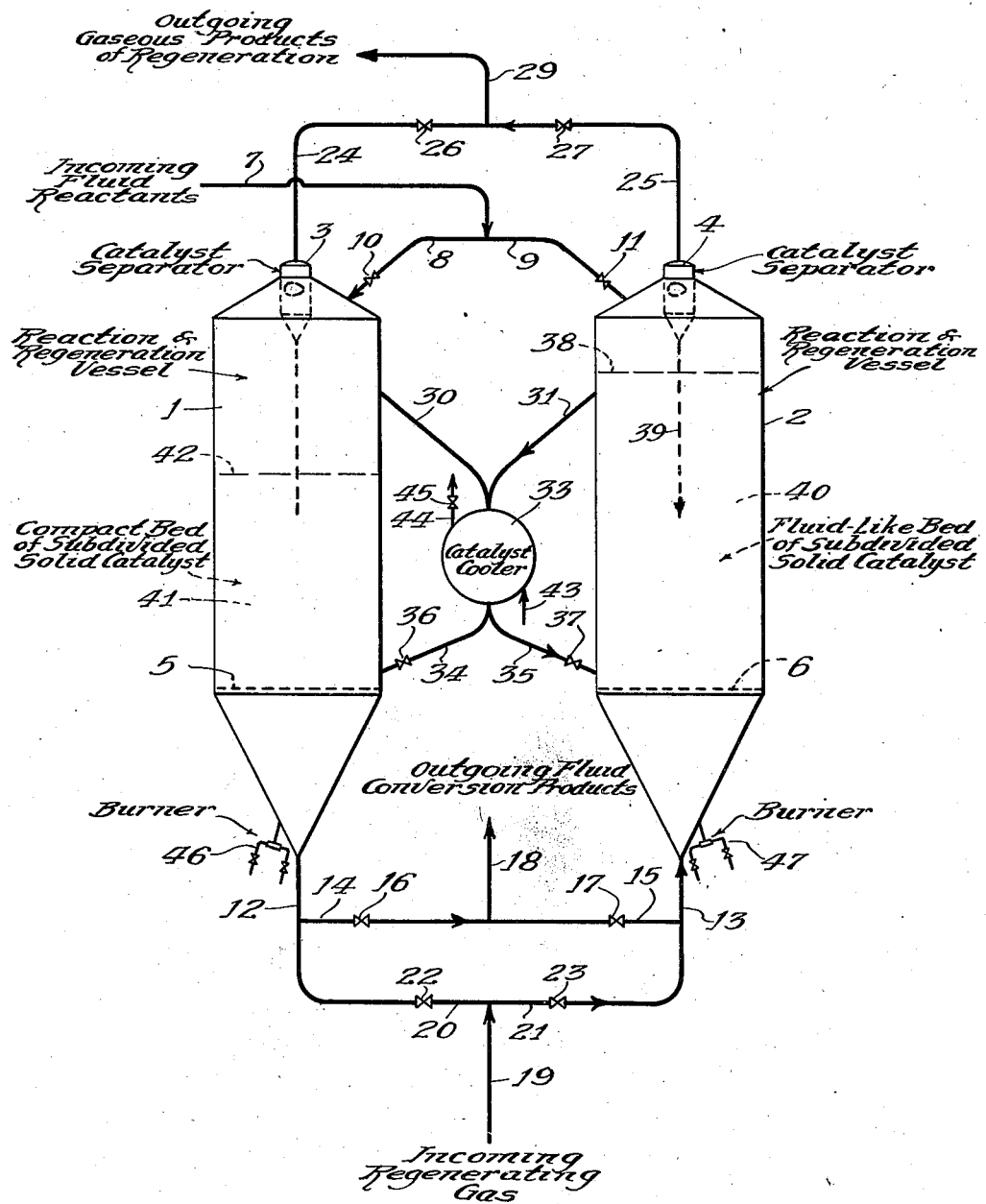

2,392,957

UNITED STATES PATENT OFFICE 2,392,957

METHOD OF CONDUCTING CATALYTIC REACTIONS

Charles L. Thomas, Riverside, Ill., assignor to Universal Oil Products Company, Chicago, Ill., a corporation of Delaware Application August 30, 1943, Serial No. 500,536

6 Claims. (Cl. 196—52)

This application is a continuation-in-part of my co-pending applications Serial Number 423,781, filed December 20, 1941 and Serial Number 426,304, filed January 10, 1942.

The invention is directed to an improved process for the conversion of fluid reactants in the presence of subdivided solid catalyst or contact material upon which deleterious heavy combustible products of the conversion reaction are deposited and from which said deposits are periodically removed in an exothermic regenerating step to restore the activity of the subdivided solid material and, when desired, store heat therein for subsequent use in conducting the conversion reaction.

The improved process herein provided is of the general type known as "fixed bed" operation in the sense that conversion of the fluid reactants in the presence of the active catalyst or contact material and regeneration of the resulting contaminated catalyst or contact material are accomplished alternately in the same reaction vessel. Preferably, in this process as in typical fixed bed operation, two or more reaction vessels are employed alternately in processing and regeneration service so that both operations may be conducted continuously. The improved mode of operation herein provided differs from conventional fixed bed practice in that the mass of subdivided solid materials undergoing regeneration are maintained in a turbulent fluid-like state but, preferably, while being employed to promote the conversion reaction, the mass or bed of previously regenerated subdivided solid particles is maintained in a relatively compact condition.

To achieve fluidization of the mass of subdivided solid particles undergoing regeneration, air or other oxidizing gas employed for burning combustible contaminants therefrom and resulting combustion gases are passed upwardly through the mass at a velocity regulated to bring about the phenomenon known as "hindered settling." This is a result of the lifting action of the oxidizing gas and combustion gases working opposite to the force of gravity on the subdivided solid particles and a condition of turbulence resembling that of a boiling liquid is obtained in the mass.

The regenerating step of the present process is further characterized in that a distinct two-phase condition exists in the regenerating zone. The turbulent fluid-like bed of solid particles is relatively dense and contains a considerably higher concentration of solid particles than that which would prevail in the absence of their pronounced hindered settling (i. e., the solid particle concentration in the fluid bed is materially greater than that which would obtain in an operation where the solid particles are carried along in the gas stream without material reverse movement or back flow of the solid particles). Above the fluid bed in the regenerating zone a light phase condition prevails in which the solid particle concentration is materially reduced due to the reduced amount or substantial absence of hindered settling in this region, and a relatively sharp line of demarkation is maintained between the dense phase fluid bed and the light phase at a level beneath the combustion gas outlet from the regenerating zone so as to minimize the quantity of solid particles entrained in the outgoing gas stream and effect a major separation of solid particles from gases in the fluid bed.

The fluidized bed mode of operation in the regenerating step has pronounced advantages. Due to its fluid-like turbulent condition the temperature is substantially uniform throughout the bed. This avoids the localized excessively high temperatures or hot spots encountered when it is attempted to accomplish regeneration in a compact bed and permits the use of a higher average temperature for regeneration. Thus, more heat may be stored in the regenerated mass and subsequently used in conducting the endothermic conversion reaction without the danger of excessive local heating in the regenerating step. With most catalysts a temperature above 1300° F. or thereabouts at any point in the bed, and in some cases even lower temperature, will result in permanent impairment or destruction of the activity of the catalyst exposed thereto.

Another advantageous feature of the invention resides in maintaining a distinct dense phase level in the regenerator at a point well beneath the combustion gas outlet. Thus, good separation of the solid particles from the outgoing gases is obtained in the regenerator so that the catalyst or contact material is retained therein much the same as in an operation employing a relatively compact bed. The further prevention of catalyst loss in the outgoing regenerating gases is readily achieved by the use of relatively simple separating equipment, such as that of the centrifugal or cyclone type, for example. This good separation and retention of solid particles in the regenerating zone can be accomplished with considerably higher linear gas velocities than those usable in a compact bed through which the oxidizing gas and resulting combustion gases are passed upwardly, thus reducing the required horizontal cross-sectional area of the regenerating vessel. Also, due to turbulence and substantially uniform temperature distribution in the fluid bed, undiluted air can ordinarily be employed as the oxidizing gas rather than air prediluted with combustion gas or other relatively inert gas as is usually necessary when the catalyst particles undergoing regeneration are in the form of a compact or non-fluidized bed. This also permits the retention of more heat in the bed, since the volume of outgoing hot gases is reduced.

It was previously thought that the use of a fluid-like bed in the reaction step would likewise be beneficial by virtue of the good temperature distribution obtained under the turbulent flow conditions and because of the higher permissible charging stock capacity for a reactor of given diameter and length due to the use of higher linear velocities than can be employed when the reactants are passed upwardly through a relatively compact bed. On the contrary, my investigations have demonstrated that improved results with respect to the yield and quality of the desired products are obtained by employing a relatively compact catalyst bed in the reaction step as compared with the results obtained under otherwise similar operating conditions while employing a fluidized bed, and these improved results can be achieved in the present process without sacrifice of charging stock capacity.

In the voluminous art on the catalytic conversion of fluid reactants and in the extensive experimental and development work on this subject, previously conducted by myself and others and to which I have access, I was unable to find any basis for my presumption that improved results would be obtained by the use of a compact bed in the reaction step as compared with those obtained under otherwise similar operating conditions while using a fluidized bed. Therefore, exploratory experimental work was necessary. The results of pertinent portions of this work are given in the subsequent examples and all of the results lead to the conclusion that an improvement in both yield and quality of the desired products is obtainable by the use of a relatively compact bed in the reaction step. This is believed to be due to improved contact between the reactants and the catalyst in the compact bed as compared with a fluidized bed, but since I know of no accurate or satisfactory method of directly measuring intimacy of contact in such an operation, this belief cannot be conclusively proven. However, visual inspection of the conditions prevailing in a fluid-like bed of subdivided solid contact material in glass models tends to verify the belief that the fluidizing medium is not uniformly contacted with the solid particles. Relatively large gas pockets or bubbles tend to form at a relatively low point in the fluid bed and move upwardly therethrough without subdivision or dispersion in the bed under the conditions of linear gas velocity, particle size of the contact material, etc., ordinarily employed in fluid bed operation.

While intimacy and uniformity of contact between the subdivided solid material and the fluidizing medium is important in the reaction step where the fluidizing medium employed comprises the reactants to be converted, it is of materially less significance and relatively unimportant in the regenerating step where the fluidizing medium is air or other oxidizing gas. In other words, any improvement in contact which might be obtained by the use of a compact bed in the regenerating step is far outweighed by the benefits which result from the use of a fluid-like bed in this step.

In the preferred embodiment of the invention, although this feature is not essential in its broader aspects, the reactants to be converted and the resulting fluid conversion products are passed downwardly through the relatively compact bed of subdivided solid catalyst or contact material in the reaction step. This permits the use of higher linear velocities for the fluid reactants and conversion products than could be employed without obtaining fluidization of the bed with upward flow therethrough and permits charging stock capacities comparable to those which can be employed in a fluidized bed without the use of a reaction vessel of excessively large diameter or horizontal cross-section.

In order to achieve good fluidization of the bed in the regenerating step and avoid, in the reaction step, an excessive degree of compaction which would hinder flow or give a high pressure drop with down-flow through the bed, I preferably employ catalyst or contact material of relatively uniform, graded particle size which is larger than commonly used in fluid bed operations and smaller than that commonly used in conventional fixed bed operations. While this is important, it is not considered essential to the successful operation of the process and the particle size selected will depend to some extent upon other operating variables. As an example, in the catalytic cracking of hydrocarbon oil employing a siliceous cracking catalyst, such as a composite of silica with one or more metal oxides, such as alumina, zirconia and magnesia, a good average range of catalyst particle size to employ is 40 to 100 mesh, or thereabouts.

The features of the invention will be found advantageous as applied to a wide variety of reactions in which fluid reactants are converted in the presence of a mass of subdivided solid particles which become contaminated and require regeneration regardless of whether the subdivided solid material has a catalytic influence on the reaction or is employed as a relatively inert contact material. In its broader aspects the invention is therefore limited only to reactions of this general class in which regeneration of the mass of solid particles is accomplished while the latter is in a fluid-like state and in which conversion or treatment of the fluid reactants is accomplished in the presence of a mass of the regenerated solid particles maintained in a relatively compact condition. However, the invention is more particularly directed to hydrocarbon conversion reactions and specifically contemplates the use of the features of the invention in the catalytic cracking of normally liquid or normally gaseous hydrocarbons and the reforming of light hydrocarbon distillates, such as gasoline, naphtha and the like, in the presence of a siliceous cracking catalyst such as above mentioned. The invention also contemplates the dehydrogenation of normally gaseous or normally liquid hydrocarbons in the presence of a dehydrogenating catalyst such as alumina composited with one or more other metal oxides such as those of chromium, molybdenum, vanadium, tungsten and tin, and preferably the higher valent forms of these metals. The catalytic aromatization or cyclization of hydrocarbons susceptible to such treatment in the presence of the same type of catalyst, above mentioned, as used in dehydrogenation is also within the scope of the invention, as well as operations involving various combinations of cracking or reforming, dehydrogenation and aromatization.

Although not strictly limited to endothermic operation in the reaction step, the features of the invention are particularly advantageous as applied to an operation in which the reaction is either endothermic or so nearly thermally balanced that radiation losses necessitates supplying heat to the reaction zone other than that contained in the incoming stream of fluid reactants. In such operations heat stored in the mass of catalyst or contact material during its exothermic regeneration is given up in the reaction step and supplies all or a substantial portion of the heat necessary for conducting the latter.

In operations of the type to which the above invention is addressed, wherein the same vessel is alternately employed in regenerating and processing service, the supply of heat to the reaction from the mass of regenerated subdivided solid material results in a gradual decrease in the temperature of the latter as the operation progresses. Thus, the average reaction temperature during the processing step is somewhere between the satisfactory low temperature and high temperature limits, and when the temperature of the bed recedes to the lower limit for satisfactory operation, the bed must be regenerated to store additional heat therein and is put back into processing service at a temperature approaching the satisfactory maximum. In some operations this would necessitate relatively short operating cycles and too frequent regeneration. Also, in some operations, notably the catalytic dehydrogenation of normally gaseous hydrocarbons, such as butane, for example, and the catalytic reforming of gasoline to improve its octane rating, the quantity of combustible contaminants deposited on the catalyst during the processing step will not furnish and store in the catalyst, upon their combustion in the regenerating step, sufficient heat to satisfy the requirements of the endothermic conversion reaction.

As a special feature of the invention in operations such as above mentioned, the heat stored in the mass of subdivided solid material during its regeneration may be increased by one or a combination of methods so as to retain sufficient heat in the bed to satisfy the requirements of the reaction step and, when desired, to prolong the period of operation between regenerations. One method of accomplishing this comprises the use, with the catalyst, of relatively inert subdivided solid material having a greater heat capacity per unit volume than the catalytic material, to improve the heat storing capacity of the bed. Preferably, the relatively inert material is in the form of discrete particles approximately corresponding in size or in fluidizing characteristics to the catalyst particles. However, I also contemplate the disposition of catalytic material on the surface of relatively inert subdivided solid particles of good heat capacity or compositing the inert material and the catalyst to form the particles of contact material employed. In general, materials such as kaolin, calcined clays or shales, quartz and the like are suitable for use as the inert material and in some instances various ores, metals, alloys, metal oxides or other solid metal compounds may be employed. The selection will, of course, depend upon the particular reaction to be conducted, the temperatures to which the subdivided solid material is subjected in the process and the severity and rapidity of temperature changes to which it is subjected.

Another method of storing additional heat in the mass of subdivided solid particles undergoing regeneration for subsequent use in conducting the conversion reaction is to supply to and burn fuel in the regenerating step other than the combustible deposits formed on solid particles in the processing step and this feature may be utilized either alone or in conjunction with the use of inert, subdivided solid material as above described.

In addition to the two special features of the invention above mentioned, it is also characteristic of the present process that, as a result of the substantially uniform temperature distribution accomplished by fluidization of the bed in the regenerating step, a higher average regenerating temperature can be employed than it is safe to use in regenerating a relatively compact bed of catalyst which is susceptible to damage at high temperature. Also, by using undiluted air as the fluidizing and oxidizing medium in the regenerating step, which is permissible on account of the fluidized condition of the bed and the resulting good temperature distribution, less heat is carried from the regenerating step in the outgoing gaseous products as compared with that which would be carried from the bed when, as in fixed bed operation, it is necessary to dilute the air employed for combustion with relatively large quantities of inert gas. Thus, even without the use of either of the aforementioned special features of the invention, it is possible to store more heat in the mass of subdivided solid material undergoing regeneration than could be safely stored while regenerating the same mass in the form of a relatively compact bed.

It will, of course, be understood that the features of the invention which permit the storage of additional heat in the bed during its regeneration will be useful in operations where the bed is maintained in a fluid-like condition during the reaction and the regenerating steps. A process of this type, which is more fully described in my aforementioned co-pending application Serial Number 426,304, is therefore entirely within the scope of the invention.

In some other operations, such as, for example, the catalytic cracking of high carbon-forming oils and catalytic aromatization, the deposits of combustible conversion products formed on the catalyst particles during the processing step are materially in excess of those required to thermally balance the processing and regenerating steps. In such instances it is desirable to abstract excess heat produced by the burning of these combustible contaminants in the regenerating step, in addition to the heat carried from the regenerating step in the outgoing stream of spent or partially spent regenerating gas. Due to the fluid-like condition of the bed in the regenerating step this can conveniently be accomplished in the process provided by the invention by establishing a local cycle of catalyst particles from a relatively high region in the fluid bed through a suitable cooler, such as, for example, a waste-heat boiler or other convenient form of heat exchanger, back into a relatively low region in the bed. This feature obviates the use of a complicated and costly heat exchange type of regenerating vessel.

The accompanying drawing diagrammatically illustrates one specific form of apparatus in which the improved process provided by the invention may be conducted.

Referring to the drawing, the apparatus here illustrated comprises substantially cylindrical, vertically disposed reaction and regenerating vessels 1 and 2, each having a substantially conical lower head and an upper head in which the respective cyclone separators 3 and 4 are mounted. Each of the vessels is also equipped with a screen or other suitable perforate member capable of retaining the particles of subdivided solid material comprising the beds in the vessels. These perforate members are indicated at 5 and 6 in the respective vessels 1 and 2 and are preferably disposed at substantially the juncture of the cylindrical shell of the vessel with the conical lower head.

The two-vessel arrangement here illustrated permits continuous operation of the process by alternate use of vessels 1 and 2 in processing and regenerating service. This is accomplished by manipulation of the various valves, as will be later described. A main inlet line 7 for the incoming fluid reactants to be converted communicates through the branch lines 8 and 9, having the respective valves 10 and 11, with the upper portion of the respective vessels 1 and 2. Lines 12 and 13 at the bottom of the respective vessels 1 and 2, establish communication between the spaces provided beneath the perforate members 5 and 6, through the respective branch lines 14 and 15, containing the respective valves 16 and 17, with an outlet header 18 for the fluid products of the conversion reaction. Lines 12 and 13 also communicate through the respective branch lines 20 and 21, containing the respective valves 22 and 23, with the inlet line 19 for the air or other oxidizing gas employed to fluidize the bed in the regenerating zone and effect combustion of the contaminated deposits on the subdivided solid material. The branch outlet lines 24 and 25 from the respective cyclone separators 3 and 4 communicate through the respective valves 26 and 27 with the main outlet line 29 for gaseous products of the regenerating operation. Lines 30 and 31 lead from a suitable point in the upper portion of the respective vessels 1 and 2 to the catalyst cooler 33, and the lines 34 and 35 lead from the catalyst cooler through the respective valves 36 and 37 to a lower point in the vessels 1 and 2 above the perforate members 5 and 6.

The arrows in the drawing indicate the direction of flow through the various lines when vessel 1 is being employed as the reaction zone and vessel 2 is being employed as the regenerating zone. During this stage of the operating cycle, valves 10, 16, 23 and 27 are open and valves 11, 17, 22 and 26 are closed, while valve 37 may be opened and valve 36 closed if the circulation of catalyst is desired through cooler 33. During this stage of the operation air or other oxidizing gas is admitted to and flows upwardly through vessel 2 in contact with the mass of previously contaminated catalyst in this zone to burn the combustible deposits therefrom and the upward velocity of the oxidizing gas and resulting combustion gases maintains the bed in a turbulent fluid-like condition. The approximate upper extremity of the dense phase fluid bed is indicated at 38 and a light phase, in which the concentration of catalyst particles is materially reduced, exists above this level. Entrained catalyst particles from the light phase enter the cyclone separator 4 with the outgoing combustion gases and substantially all of the entrained solid particles are separated from the gases in this zone and returned through standpipe 39 to the dense phase fluid bed 40. The combustion gases from separator 4 are directed through line 25, valve 27 and line 29, preferably to suitable heat recovery equipment not pertinent to the present invention and, therefore, not illustrated.

During regeneration of the catalyst, as above described, in vessel 2, hydrocarbons or other fluid reactants to be converted are admitted preferably, but not necessarily, in preheated state through line 7, line 8 and valve 10 to vessel 1 and passed downwardly with resulting fluid conversion products through the hot relatively compact bed 41 of previously regenerated catalyst, wherein their conversion to the desired products is accomplished with the resulting deposition of deleterious combustible conversion products on the catalyst particles. The resulting fluid conversion products are discharged through lines 12 and 14, valve 16 and line 18, preferably to suitable fractionating and recovery equipment, not illustrated, and, when desired, in case any substantial quantity of catalyst particles escape from the bed 41 through member 5, suitable separating equipment, not illustrated, may be interposed in line 18 or within the conical lower head of chamber 1 to recover these particles.

It will be noted with reference to the drawing that line 42, indicating the approximate upper extremity of the compact catalyst bed in vessel 1, is at a considerably lower level than line 38, indicating the upper extremity of the fluid bed in vessel 2. This, of course, is due to the fact that bed 41 is in a relatively compact condition, while bed 40 is fluidized so that with substantially the same weight of catalyst in each vessel, as the process is preferably operated, the bed in the vessel where the conversion reaction is being conducted occupies considerably less space than that in the vessel wherein regeneration is taking place.

When the temperature of the bed in vessel 1 is reduced, by the liberation of the heat therefrom to the reaction taking place in this zone, to a value approaching the lower limit of the desired range of operating temperature, the conversion step is shifted to vessel 2 and the regenerating step is shifted to vessel 1, preferably after vessel 1 has been substantially purged of fluid reactants and conversion products and after vessel 2 has been substantially purged of oxidizing gas and combustion gases, such purging being accomplished by any convenient well known means, not shown. During that portion of the operating cycle in which vessel 1 is employed as the regenerator and vessel 2 as the zone in which the conversion reaction is conducted, valves 10, 16, 23 and 27 are closed and valves 11, 17, 22 and 26 are open, the flow through the system being as would be indicated by the arrows in a mirror image of the drawing.

The catalyst cooler 33, as previously mentioned, is operated for the local circulation of catalyst from the fluid bed undergoing regeneration through the cooler back into this bed when it is desired to abstract heat from the regenerating step in addition to that carried from the regenerating zone in the outgoing combustion gases. As indicated in the drawing, cooler 33 is so disposed and connected to vessels 1 and 2 that it will serve whichever vessel is being employed as the regenerating zone. The cooler is of the heat exchange type in the case illustrated and a suitable cooling medium, such as water, steam, relatively cold oil or other suitable fluid to be heated is supplied to the cooler through line 43, wherethrough it passes in indirect contact and heat exchange relation with the stream of catalyst particles and from which resulting heated fluid is discharged through line 34 and valve 45. Regulation of the opening through valve 36 or valve 37, as the case may be, will control the flow of catalyst through cooler 33 and this, in conjunction with control of the rate at which cooling fluid is supplied to cooler 33 and its temperature, will regulate the additional heat abstracted from the fluid bed undergoing regeneration.

When inert subdivided solid material is employed with the catalyst, as previously explained, to increase heat storage in the bed, it may conveniently be mixed with the catalyst particles before the operation is started and charged to the two reaction vessels.

One or a plurality of suitable burners indicated at 46 and 47 is provided for supplying fuel and additional air to vessels 1 and 2 from an exterior source when it is desired to augment the heat evolved and store it in the fluid-like bed of subdivided solid material during regeneration for subsequent use in conducting the conversion reaction. Any desired type of fuel may be employed, although gaseous or liquid fuel is ordinarily preferred.

The following examples are presentative of a series of tests conducted to determine the advantages of the features of the invention as applied to the catalytic cracking of hydrocarbon oil.

A synthetically prepared silica-alumina cracking catalyst substantially free of alkali metal compounds and having a particle size ranging from approximately 40 to 100 mesh was employed in each of these tests to crack a Mid-Continent gas oil. An average reaction temperature of approximately 950° F. was employed in each case using weight space velocities (weight of oil supplied to the reaction zone per hour, per unit weight of catalyst present in the reaction zone) of 1 and 2. 1 and 0.5 weights of catalyst were used per unit weight of oil charged to the reaction zone before the catalyst was regenerated (i. e., a processing period of 60 minutes between regenerations, in each case). The cracking reaction and regeneration of the catalyst were alternately conducted in the same reaction vessel. In two of the tests charging oil was supplied to the lower portion of the reaction vessel and resulting oil vapors and gases were directed upwardly through the catalyst bed during the cracking period to maintain the bed in a turbulent fluid-like condition. In the other two tests the charging oil was supplied to the upper portion of the reaction vessel and resulting oil vapors and gases were passed downwardly through the catalyst bed which was maintained in a compact condition. The charging oil, in each case, was supplied to the reaction zone in liquid state at substantially atmospheric temperature and substantially atmospheric pressure was maintained at the outlet end of the reaction zone. In all four of the tests air was employed for regeneration and passed upwardly through the catalyst bed which was maintained in a turbulent fluid-like condition. The following table summarizes the operating conditions and results of these tests:

| Test number | 1 | 1A | 2 | 2A |
|---|---|---|---|---|
| *Operating conditions* | | | | |
| Condition of bed during processing | Compact | Fluidized | Compact | Fluidized. |
| Condition of bed during regeneration | Fluidized | do | Fluidized | Do. |
| Average reaction temperature | 950° F | 950° F | 950° F | 950° F. |
| Average regenerating temperature | 1050° F | 1050° F | 1050° F | 1050° F. |
| Operating pressure in reaction zone outlet | Atmospheric | Atmospheric | Atmospheric | Atmospheric. |
| Weight hourly space velocity | 1.0 | 1.0 | 2.0 | 2.0. |
| Processing period | 60 minutes | 60 minutes | 60 minutes | 60 minutes. |
| *Products (weight per cent based on charging stock)* | | | | |
| Gasoline (400° F., E. P.) | 34.2 | 38.2 | 34.3 | 32.0 |
| Catalyst deposits | 11.9 | 8.0 | 5.3 | 3.0 |
| $C_4$ and lighter gases | 35.7 | 22.0 | 21.8 | 14.9 |
| Total weight per cent of charging oil converted to lighter and heavier fractions | 81.8 | 68.2 | 61.9 | 49.9 |
| *Analysis of gasoline* | | | | |
| Weight per cent olefins | 15.0 | 19.0 | 20.0 | 27.0 |
| Weight per cent aromatics | 41.0 | 32.0 | 37.0 | 28.0 |
| Weight per cent paraffins + naphthenes | 44.0 | 52.0 | 43.0 | 45.0 |
| Octane number (A. S. T. M. motor method) | 83.8 | 81.6 | 80.8 | 80.1 |

It will be noted from the above tabulation that, under otherwise comparable operating conditions, when the catalyst bed was maintained in a compact condition during processing improved results were obtained with respect to the weight percent of gas oil converted and that the octane rating and aromatic content of the gasoline were improved. Also, at the higher space velocity (higher charging stock rate) a higher percentage of gasoline was obtained based on the charging oil, thus greatly increasing the rate of gasoline production.

I claim as my invention:

1. In a hydrocarbon conversion process wherein the hydrocarbons are contacted in a reaction zone with a body of subdivided solid catalyst during a period of processing and said body of catalyst is subsequently regenerated in situ by the burning of combustible deposits therefrom, the improvement which comprises maintaining said body of catalyst in the form of a relatively compact mass during the processing period by passing the hydrocarbons to be converted downwardly through said body, maintaining said body of catalyst in a fluidized condition during the regeneration period by passing a regenerating gas upwardly therethrough at a linear velocity such that a relatively dense fluidized catalyst phase exists as a result of hindered settling of the catalyst particles and said relatively dense phase is superimposed by a relatively light phase, withdrawing effluent regeneration gases from said relatively light phase at a point substantially above the line of demarcation between said relatively dense and relatively light phases, separating the relatively small quantity of catalyst particles entrained in said effluent gases, and returning the thus separated catalyst to said relatively dense phase.

2. The improvement as defined in claim 1 further characterized in that the catalyst is employed in admixture with relatively inert solid particles of higher heat capacity than the catalyst.

3. The improvement as defined in claim 1 further characterized in that extraneous fuel is introduced to and burned in said zone during the regenerating step.

4. The process of claim 1, wherein said conversion reaction comprises the catalytic cracking of hydrocarbons.

5. The process of claim 1, wherein said conversion reaction comprises the catalytic dehydrogenation of hydrocarbons.

6. The process of claim 1, wherein said conversion reaction comprises the catalytic aromatization of hydrocarbons.

CHARLES L. THOMAS.